United States Patent
van Rensburg et al.

(10) Patent No.: US 7,418,270 B2
(45) Date of Patent: Aug. 26, 2008

(54) APPARATUS AND METHOD FOR OPTIMAL POWER ALLOCATION BETWEEN DATA AND VOICE IN A 1XEV-DV WIRELESS NETWORK

(75) Inventors: Cornelius van Rensburg, Dallas, TX (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 11/019,756

(22) Filed: Dec. 21, 2004

(65) Prior Publication Data

US 2006/0135194 A1 Jun. 22, 2006

(51) Int. Cl.
*H04Q 7/20* (2006.01)

(52) U.S. Cl. .................. 455/522; 455/561; 455/450

(58) Field of Classification Search .......... 455/522, 455/517, 13.2, 561, 562.1, 452.1, 62, 405, 455/69, 63, 560, 428; 370/318, 332

See application file for complete search history.

(56) References Cited

U.S. PATENT DOCUMENTS

| 5,924,015 | A  | * | 7/1999  | Garrison et al. | 455/13.4  |
| 6,304,562 | B1 | * | 10/2001 | Kim et al.      | 370/332   |
| 2003/0003941 | A1 | * | 1/2003 | Goto et al     | 455/522   |
| 2004/0063468 | A1 | * | 4/2004 | Frank           | 455/561   |
| 2005/0003824 | A1 | * | 1/2005 | Siris           | 455/452.1 |
| 2005/0096076 | A1 | * | 5/2005 | Gu et al.       | 455/522   |
| 2005/0202839 | A1 | * | 9/2005 | Merboth et al.  | 455/522   |
| 2007/0127407 | A1 | * | 6/2007 | Attar et al.    | 370/318   |

* cited by examiner

*Primary Examiner*—Tan Trinh

(57) ABSTRACT

A base station for use in a 1xEV-DV wireless network comprising: 1) a radio frequency (RF) transceiver for transmitting to mobile stations in voice traffic channels and in at least one packet data channel and 2) a power allocation controller for adjusting the total transmit power allocated to the voice traffic channels and the at least one packet data channel in response to changing conditions in the 1xEV-DV wireless network, the power allocation controller monitors and detects trends in the traffic channel transmit power requirements of the voice-user mobile stations and adjusts the total transmit power according to the detected trend.

18 Claims, 3 Drawing Sheets

APPARATUS AND METHOD FOR OPTIMAL POWER ALLOCATION BETWEEN DATA AND VOICE IN A 1XEV-DV WIRELESS NETWORK

TECHNICAL FIELD OF THE INVENTION

The present invention relates generally to wireless communication systems and, more specifically, to a technique for dividing power between data and voice users in the forward channel of a sector of a 1xEV-DV wireless network.

BACKGROUND OF THE INVENTION

Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. To attract new customers, wireless service providers implement new services, especially digital data services that, for example, enable a user to browse the Internet or send and receive e-mail.

Code division multiple access (CDMA) technology is used in a variety of wireless networks, including wireless networks that comply with the 1xEV-DV standard. In a CDMA network, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, and spread prior to transmission by the mobile station. The data symbols following interleaving may be separated into an in-phase (I) data stream and a quadrature (Q) data stream for QPSK modulation of an RF carrier. One such implementation is found in the 1xEV-DV version of the IS-2000 standard.

A 1xEV-DV wireless network supports both voice service and data service, such as packet data service. In a 1xEV-DV wireless network, two types of interference limit the performance of the forward link (i.e., transmission link from base station to mobile station). When the mobile station is close to the base station, same cell interference due to multi-path reflections is the predominant type of interference. When the mobile station is at the outer edge of the cell site, neighboring cell interference is the predominant type of interference. Same cell interference is directly related to the transmit power of the base station. Since a 1xEV-DV base station continuously transmits at maximum power for packet data users, same cell interference may be extreme in a 1xEV-DV wireless network. Unfortunately, due to a number of constraints, conventional 1xEV-DV mobile stations do not implement any of the known interference cancellation techniques. As a result, 1xEV-DV cells typically maintain a maximum of only three or four voice calls while maintaining data sessions.

A conventional 1xEV-DV wireless network uses a fixed division of power between data users and voice users that is determined by network operator policy. In an exemplary implementation, a base transceiver station (BTS) first satisfies the power requirements of the voice users and then allocates the remaining power to the data users. The problem with this method is that a single voice user can dictate the data power allocation requirements and therefore throttle the data throughput. This is somewhat illogical, since data users typically pay higher rates than voice-only users.

In another exemplary implementation, the voice power level and the data power level are pre-allocated, whether or not there are active users of each service. This is not an optimal situation, since data users will not experience high throughput even in a cell with few or no voice users. On the other hand, if a cell carries a number of voice users and data users and the interference increases such that the voice users require more power than the pre-allocated power level, the BTS may randomly drop voice calls, or even ALL the voice calls, because the BTS may not be able to determine which voice user to drop in order to maintain the power allocation.

Therefore, there is a need in the art for an improved 1x EV-DV wireless networks. In particular, there is a need for a 1xEV-DV wireless network that is capable of dynamically allocating power in the forward channel between voice users and data users.

SUMMARY OF THE INVENTION

The present invention provides an apparatus and a related method that determine the optimal power division between data users and voice users on the forward link in a 1xEv-DV sector. The algorithm performed by the present invention is optimal since it dynamically assigns power where power is needed most. As a result, the present invention maximizes both the number of voice users and data throughput.

To address the above-discussed deficiencies of the prior art, it is a primary object of the present invention to provide a base station for use in a 1xEV-DV wireless network capable of communicating with mobile stations in a coverage area of the 1xEV-DV wireless network. According to an advantageous embodiment of the present invention, the base station comprises: 1) a radio frequency (RF) transceiver capable of transmitting to the mobile stations in a plurality of voice traffic channels and in at least one packet data channel; and 2) a power allocation controller capable of adjusting the total transmit power allocated to the plurality of voice traffic channels and allocated to the at least one packet data channel in response to changing conditions in the 1xEV-DV wireless network.

According to one embodiment of the present invention, the power allocation controller is capable of monitoring traffic channel transmit power requirements of a first plurality of mobile stations operating in the plurality of voice traffic channels.

According to another embodiment of the present invention, the power allocation controller is capable of determining a trend in the traffic channel transmit power requirements of the first plurality of mobile stations.

According to still another embodiment of the present invention, the power allocation controller is capable of adjusting the total transmit power allocated to the plurality of voice traffic channels and allocated to the at least one packet data channel in response to the trend in the traffic channel transmit power requirements of the first plurality of mobile stations.

According to yet another embodiment of the present invention, the power allocation controller increases the total transmit power allocated to the plurality of voice traffic channels if the trend in the traffic channel transmit power requirements of the first plurality of mobile stations is increasing.

In one embodiment of the present invention, the power allocation controller decreases the total transmit power allocated to the plurality of voice traffic channels if the trend in the traffic channel transmit power requirements of the first plurality of mobile stations is decreasing.

In another embodiment of the present invention, the power allocation controller is capable of comparing the total transmit power allocated to the plurality of voice traffic channels to a maximum threshold and, if the total transmit power allocated to the plurality of voice traffic channels exceeds the maximum threshold, the power allocation controller is capable of causing the base station to deny voice service to a new mobile station attempting to access the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
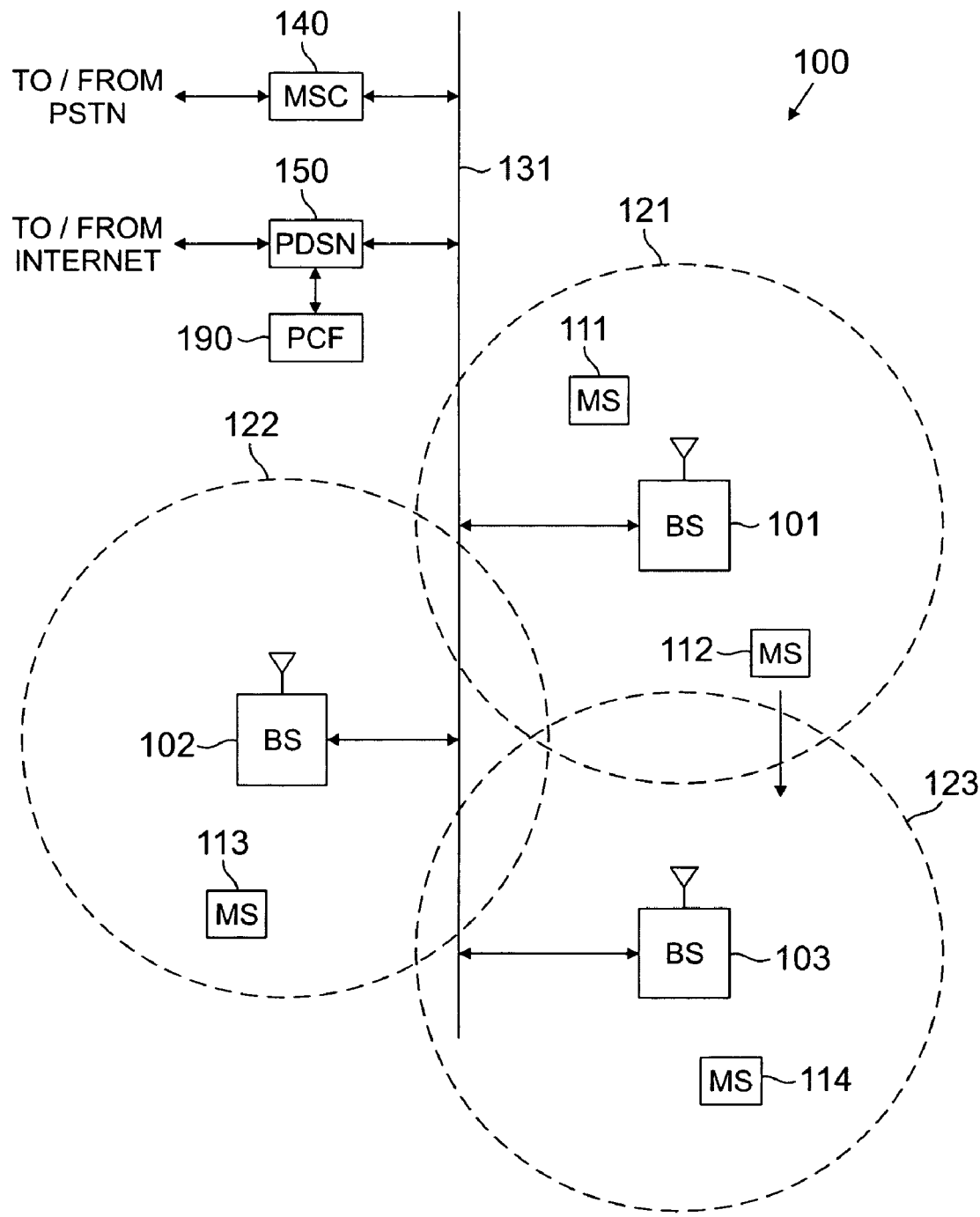
FIG. 1 illustrates an exemplary wireless network that allocates power between voice and data users in the forward channel according to the principles of the present invention.
Figure 2:
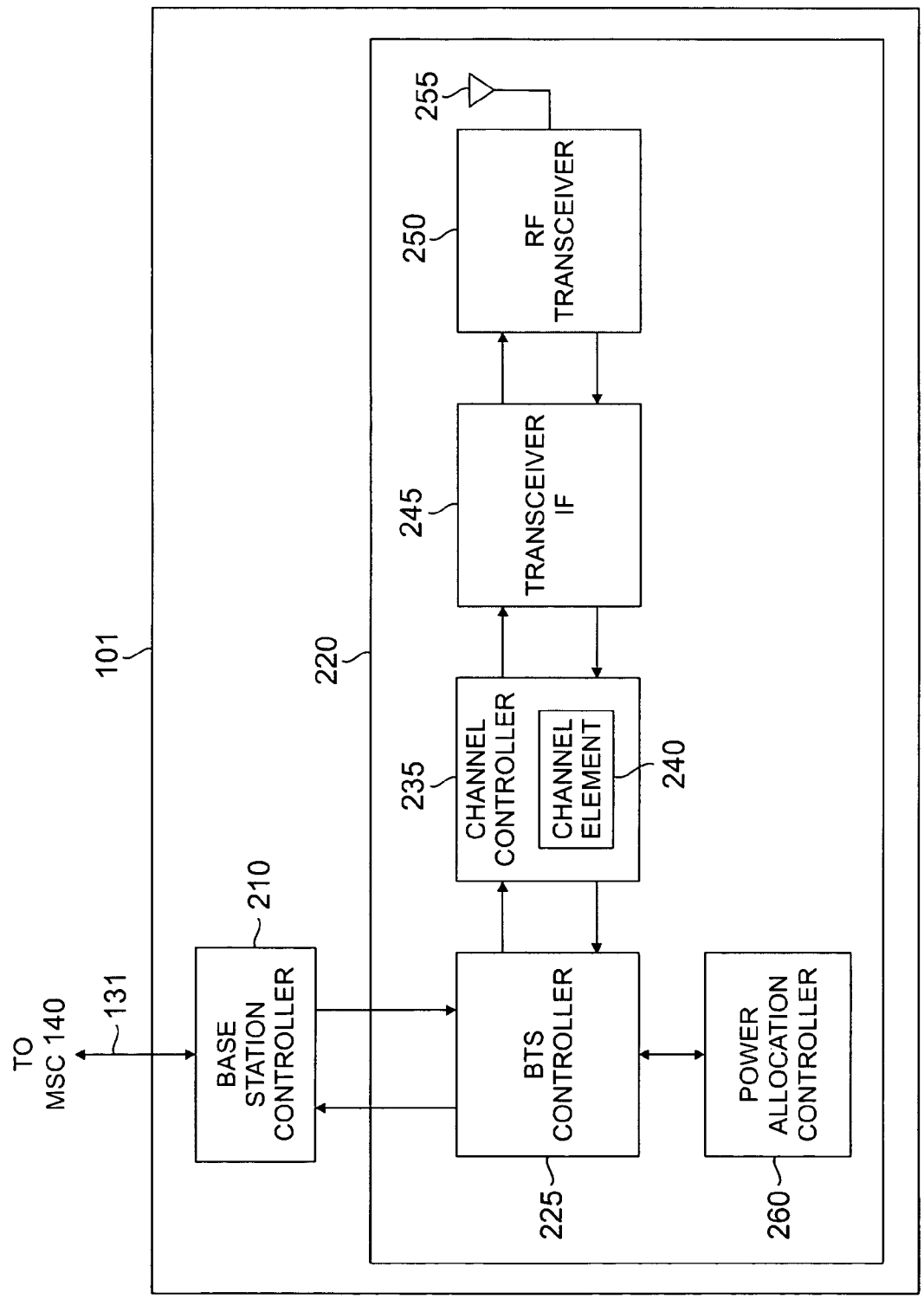
FIG. 2 illustrates in greater detail a base station that allocates power between voice and data users in the forward channel according to the principles of the present invention.
Figure 3:
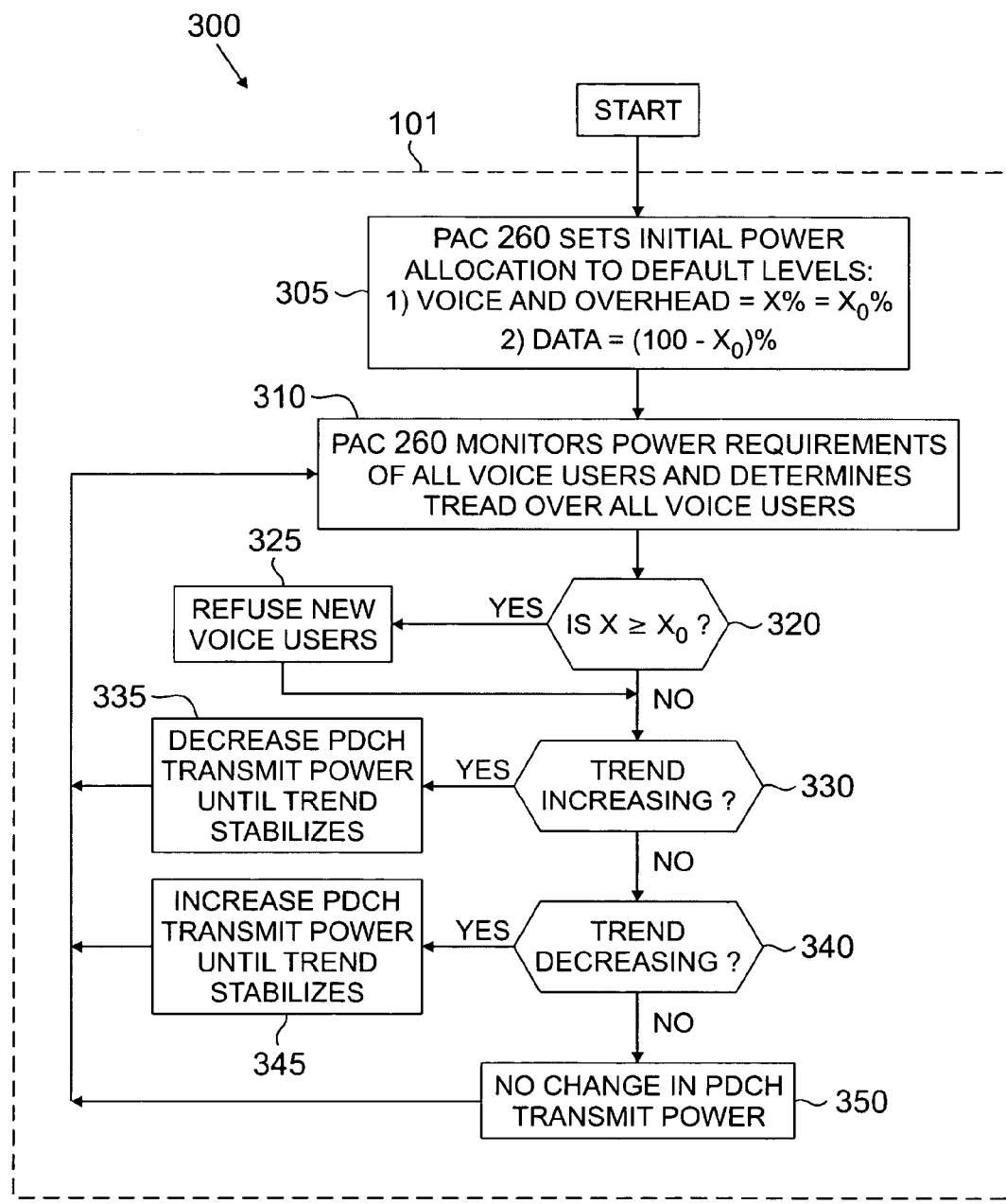
FIG. 3 is a flow diagram illustrating the operation of the exemplary base station according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100, which allocates power between voice and data users in the forward channel according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the 1xEV-DV standard. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, however, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

FIG. 2 illustrates in greater detail exemplary base station 101, which allocates power between voice and data users in the forward channel according to the principles of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, antenna array 255, and power allocation controller 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

According to the principles of the present invention, power allocation controller (PAC) 260 is capable of dynamically allocating transmit power in the forward channel between voice users and data users according to changing network conditions. In particular, power allocation controller 260 sets the transmit power levels for individual voice users and sets the transmit power for the packet data channel (PDCH) in 1xEV-DV wireless network 100. PAC 260 may perform power allocation in one or more sectors of BS 101, or in all of the sectors of BS 101.

As is well known, a conventional 1xEV-DV base station transmits data and voice traffic using all of the power of the base transceiver subsystem. Power allocation is important because higher transmit power on the packet data channel means higher data throughput for data services. The tradeoff is that higher transmit power to data users means more interference for the voice users.

The present invention proposes an algorithm that dynamically distributes power between data and voice users and, if necessary, denies service to new voice users. According to an advantageous embodiment of the present invention, power allocation controller 260 in BTS 220 tracks the total power requirements of all power-controlled voice channels. The total voice power allocation is then varied proportionally to the general trend. In other words, if the trend increases, the voice power allocation increases, and vice versa.

FIG. 3 depicts flow diagram 300, which illustrates the operation of exemplary base station 101 according to one embodiment of the present invention. Initially, power allocation controller (PAC) 260 allocates to voice and overhead channels a default percentage, $X_0$%, of total transmit power and allocates the remaining percentage, (100-$X_0$)%, of total power to data users (process step 305). The value of $X_0$ is determined by the network operator.

Thereafter, as voice users and data users drop in and out of the sector and/or cell site, PAC 260 monitors the power requirements of all mobile stations using voice services (process step 305). Mobile stations in wireless network 100 transmit received signal strength indicator (RSSI) signals to the base stations. BTS 220 uses these measurements to control the level of transmit power to the mobile stations. If there is a large amount of interference from the packet data channel (PDCH), the mobile stations using voice services will require higher transmit power from BTS 220. By monitoring the power requirements of all voice users, PAC 260 detects if a trend of increasing power or decreasing power, or neither, is present.

As voice users and data users drop in and out of the sector and/or cell site and PAC 260 dynamically allocates transmit power, PAC 260 also monitors to determine whether the percentage of transmit power for voice users ever meets or exceeds the default percentage ($X_0$%) or some other predetermined maximum threshold (process step 320). If yes, PAC 260 causes BTS 220 to deny service to new voice users (process step 325). If no, PAC 260 allocates transmit power according to the trend, if any, detected in process step 310.

To do this, PAC 260 determines if the voice-user transmit power trend is increasing (process step 330). If the transmit power requirements over all mobile stations using voice services is an increasing trend, PAC 260 reduces the percentage of transmit power for the packet data channel (PDCH) and increases the percentage of transmit power for the voice channels until the trend stabilizes (process step 335). The total transmit power in all forward channels of BTS 220 remains fixed at a constant maximum power level. PAC 260 then continues to monitor the voice-user transmit power requirements (process step 310).

If the voice-user transmit power trend is not increasing, PAC 260 determines if the voice-user power trend is decreasing (process step 340). If the transmit power requirements over all mobile station using voice services is a decreasing trend, PAC 260 increases the percentage of the PDCH transmit power and decreases the percentage of transmit power for the voice channels until the trend stabilizes (process step 345). PAC 260 then continues to monitor the voice-user transmit power requirements (process step 310).

If the transmit power trend is not increasing or decreasing, PAC 260 does not change the PDCH transmit power (process step 350). Thereafter, PAC 260 continues to monitor the voice user transmit power requirements (process step 310).

Advantageously, in a base station according to the principles of the present invention, a single voice user cannot dictate the data power allocation of the base station, since the allocation is based on overall trend information, not the requirements or statistics of an individual mobile station. Thus, in a cell site of sector with few voice users, a large amount of power can be allocated to the data users.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a 1xEV-DV wireless network capable of communicating with mobile stations in a coverage area of said 1xEV-DV wireless network, a base station comprising:
   a radio frequency (RF) transceiver capable of transmitting to said mobile stations in a plurality of voice traffic channels and in at least one packet data channel; and
   a power allocation controller capable of adjusting the total transmit power allocated to said plurality of voice traffic channels and allocated to said at least one packet data channel in response to changing conditions in said 1xEV-DV wireless network, and comparing the total transmit power allocated to said plurality of voice traffic channels to a maximum threshold and, if the total transmit power allocated to said plurality of voice traffic channels exceeds said maximum threshold, said power allocation controller is capable of causing said base station to deny voice service to a new mobile station attempting to access said base station.

2. The base station as set forth in claim 1, wherein said power allocation controller is capable of monitoring traffic channel transmit power requirements of a first plurality of mobile stations operating in said plurality of voice traffic channels.

3. The base station as set forth in claim 2, wherein said power allocation controller is capable of determining a trend in said traffic channel transmit power requirements of said first plurality of mobile stations.

4. The base station as set forth in claim 3, wherein said power allocation controller is capable of adjusting the total transmit power allocated to said plurality of voice traffic channels and allocated to said at least one packet data channel in response to said trend in said traffic channel transmit power requirements of said first plurality of mobile stations.

5. The base station as set forth in claim 3, wherein said power allocation controller decreases the total transmit power allocated to said plurality of voice traffic channels if said trend in said traffic channel transmit power requirements of said first plurality of mobile stations is decreasing.

6. The base station as set forth in claim 4, wherein said power allocation controller increases the total transmit power allocated to said plurality of voice traffic channels if said trend in said traffic channel transmit power requirements of said first plurality of mobile stations is increasing.

7. A wireless network capable of communicating with mobile station in a coverage area of said wireless network according to the 1xEV-DV protocol, said wireless network comprising:
   a plurality of base stations, each of said plurality of base station comprising:
   a radio frequency (RF) transceiver capable of transmitting to said mobile stations in a plurality of voice traffic channels and in at least one packet data channel; and
   a power allocation controller capable of adjusting the total transmit power allocated to said plurality of voice traffic channels and allocated to said at least one packet data channel in response to changing conditions in said wireless network, and comparing the total transmit power allocated to said plurality of voice traffic channels to a maximum threshold and, if the total transmit power allocated to said plurality of voice traffic channels exceeds said maximum threshold, said power allocation controller is capable of causing said base station to deny voice service to a new mobile station attempting to access said base station.

8. The wireless network as set forth in claim 7, wherein said power allocation controller is capable of monitoring traffic channel transmit power requirements of a first plurality of mobile stations operating in said plurality of voice traffic channels.

9. The wireless network as set forth in claim 8, wherein said power allocation controller is capable of determining a trend in said traffic channel transmit power requirements of said first plurality of mobile stations.

10. The wireless network as set forth in claim 9, wherein said power allocation controller is capable of adjusting the total transmit power allocated to said plurality of voice traffic channels and allocated to said at least one packet data channel in response to said trend in said traffic channel transmit power requirements of said first plurality of mobile stations.

11. The wireless network as set forth in claim 9, wherein said power allocation controller increases the total transmit power allocated to said plurality of voice traffic channels if said trend in said traffic channel transmit power requirements of said first plurality of mobile stations is increasing.

12. The wireless network as set forth in claim 9, wherein said power allocation controller decreases the total transmit power allocated to said plurality of voice traffic channels if said trend in said traffic channel transmit power requirements of said first plurality of mobile stations is decreasing.

13. For use in a 1xEV-DV wireless network capable of communicating with mobile stations in a coverage area of the 1xEV-DV wireless network, a method of operating a base station comprising the steps of:
   transmitting to the mobile stations in a plurality of voice traffic channels and in at least one packet data channel; and
   adjusting the total transmit power allocated to the plurality of voice traffic channels and allocated to the at least one packet data channel in response to changing conditions in the 1xEV-DV wireless network; and
   comparing the total transmit power allocated to said plurality of voice traffic channels to a maximum threshold and, if the total transmit power allocated to said plurality of voice traffic channels exceeds said maximum threshold, causing said base station to deny voice service to a new mobile station attempting to access said base station.

14. The method as set forth in claim 13, further comprising the step of monitoring traffic channel transmit power requirements of a first plurality of mobile stations operating in the plurality of voice traffic channels.

15. The method as set forth in claim 14, further comprising the step of determining a trend in the traffic channel transmit power requirements of the first plurality of mobile stations.

16. The method as set forth in claim 15, wherein the step of adjusting the total transmit power allocated to the plurality of voice traffic channels and allocated to the at least one packet data channel is performed in response to the trend in the traffic channel transmit power requirements of the first plurality of mobile stations.

17. The method as set forth in claim 15, wherein the step of adjusting the total transmit power allocated to the plurality of voice traffic channels and allocated to the at least one packet data channel comprises the sub-step of increasing the total transmit power allocated to the plurality of voice traffic channels if the trend in the traffic channel transmit power requirements of the first plurality of mobile stations is increasing.

18. The method as set forth in claim 15, wherein the step of adjusting the total transmit power allocated to the plurality of voice traffic channels and allocated to the at least one packet data channel comprises the sub-step of decreasing the total transmit power allocated to the plurality of voice traffic channels if the trend in the traffic channel transmit power requirements of the first plurality of mobile stations is decreasing.

* * * * *